(12) United States Patent
Hall et al.

(10) Patent No.: US 8,908,675 B2
(45) Date of Patent: Dec. 9, 2014

(54) VIRTUAL PAIRING FOR CONSISTENT DATA BROADCAST

(75) Inventors: Brendan Hall, Eden Prairie, MN (US); Srivatsan Varadarajan, St. Louis Park, MN (US); Kevin R. Driscoll, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 231 days.

(21) Appl. No.: 13/350,304

(22) Filed: Jan. 13, 2012

(65) Prior Publication Data

US 2013/0182552 A1   Jul. 18, 2013

(51) Int. Cl.
- *H04L 12/28* (2006.01)
- *H04J 3/26* (2006.01)
- *H04L 12/43* (2006.01)
- *H04J 3/00* (2006.01)

(52) U.S. Cl.
USPC ............ 370/351; 370/432; 370/458; 370/464

(58) Field of Classification Search
CPC ....................................................... H04L 29/04
See application file for complete search history.

(56) References Cited

U.S. PATENT DOCUMENTS

| | | | |
|---|---|---|---|
| 5,751,932 A | 5/1998 | Horst | |
| 5,838,894 A | 11/1998 | Horst | |
| 6,233,702 B1 | 5/2001 | Horst | |
| 6,622,258 B1 | 9/2003 | Lee et al. | |
| 6,651,106 B1 | 11/2003 | Driscoll | |
| 7,372,859 B2 | 5/2008 | Hall et al. | |
| 7,502,334 B2 | 3/2009 | Hall et al. | |
| 7,596,153 B2 | 9/2009 | Paulitsch et al. | |
| 7,606,179 B2 | 10/2009 | Hall et al. | |
| 7,649,835 B2 | 1/2010 | Hall et al. | |
| 7,656,881 B2 | 2/2010 | Hall et al. | |
| 7,668,084 B2 | 2/2010 | Driscoll et al. | |
| 7,668,204 B2 | 2/2010 | Hall et al. | |
| 7,729,297 B2 | 6/2010 | Hall et al. | |
| 7,778,159 B2 | 8/2010 | Driscoll et al. | |
| 7,783,808 B2 | 8/2010 | Hall et al. | |
| 7,889,683 B2 | 2/2011 | Paulitsch et al. | |
| 7,912,094 B2 | 3/2011 | Hall et al. | |
| 8,010,846 B1 | 8/2011 | Birkedahl et al. | |
| 8,130,773 B2 | 3/2012 | Hall et al. | |

(Continued)

OTHER PUBLICATIONS

Kevin Driscoll, AADL Error Modeling of Different Network Protocols, Apr. 2011, Honeywell, pp. 1-18.*

(Continued)

*Primary Examiner* — Omar Ghowrwal
(74) *Attorney, Agent, or Firm* — Fogg & Powers LLC

(57) ABSTRACT

A network comprises a plurality of nodes; and a plurality of links communicatively coupling each of the plurality of nodes to at least one respective adjacent node of the plurality of nodes via a first communication channel and to another respective adjacent node of the plurality of nodes via a second communication channel. At least one of the plurality of nodes is a source node configured to source data. The source node is configured to form a virtual self-checking pair with one of the respective adjacent node on the first communication channel or the respective adjacent node on the second communication channel to achieve a consistent broadcast of data on the first and second communication channels. Data exchanged between the source node and the respective adjacent node in the virtual self-checking pair is only sourced by the source node.

9 Claims, 6 Drawing Sheets

(56) References Cited

U.S. PATENT DOCUMENTS

| | | |
|---|---|---|
| 2005/0129037 A1 | 6/2005 | Zumsteg et al. |
| 2005/0129038 A1 | 6/2005 | Hall et al. |
| 2005/0152379 A1* | 7/2005 | Hall et al. ............ 370/400 |
| 2006/0092856 A1 | 5/2006 | Mitsumori |
| 2008/0107024 A1 | 5/2008 | Driscoll et al. |
| 2008/0144668 A1 | 6/2008 | Hall et al. |
| 2009/0086653 A1* | 4/2009 | Driscoll et al. ............ 370/258 |
| 2009/0116502 A1 | 5/2009 | Hall et al. |
| 2009/0122812 A1 | 5/2009 | Steiner et al. |
| 2009/0141744 A1 | 6/2009 | Poledna et al. |
| 2009/0323704 A1 | 12/2009 | Hall et al. |
| 2010/0284301 A1 | 11/2010 | Paulitsch et al. |
| 2011/0103390 A1 | 5/2011 | Hall et al. |
| 2013/0215905 A1 | 8/2013 | Driscoll et al. |

OTHER PUBLICATIONS

Paulitsch et al., Starting and Resolving a Partitioned Brain, May 5-7, 2008, ISORC, Object Oriented Real-Time Distributed Computing (ISORC), 2008 11th IEEE International Symposium on, pp. 415-421.*

TTTech Computertechnik AG, "A Platform for Safety-Critical Applications", pp. 1-13, 2005.

TTTech Computertechnik AG, "TTEthernet—A Powerful Network Solution for All Purposes", pp. 1-15, 2010.

Hall et al., "Ringing Out Fault Tolerance a New Ring Network for Superior Low-Cost Dependabilitiy", "International Conference on Dependable Systems and Networks (DSN'05)", 2005, pp. 298-307.

"Flexray Communications System Protocol Specification Version 2.1 Revison A", Dec. 2005, pp. 1-245, Publisher: FlexRay Consortium.

* cited by examiner

US 8,908,675 B2

VIRTUAL PAIRING FOR CONSISTENT DATA BROADCAST

BACKGROUND

In safety relevant systems, communications channels are often replicated for higher availability. However, if a simplex source of data that uses the multiple channels fails, it can send dissimilar messages between channels. If the simplex source feeds any redundant computation, such a fault can lead to a divergence between computation sets. Some systems attempt to mitigate errors from such faults by comparing the content of each message received at a node over one channel with the content of the corresponding message received at the node over another channel. However, this comparison of content can consume a lot of bandwidth. Some other systems attempt to mitigate errors by comparing a signature or compressed parity information. Such systems do not require the same amount of bandwidth since the entire content of each message is not being compared. However, since the entire content is not being compared, such systems may not properly identify all faults.

SUMMARY

In one embodiment, a network is provided. The network comprises a plurality of nodes; and a plurality of links communicatively coupling each of the plurality of nodes to at least one respective adjacent node of the plurality of nodes via a first communication channel and to another respective adjacent node of the plurality of nodes via a second communication channel. At least one of the plurality of nodes is a source node configured to source data. The source node is configured to form a virtual self-checking pair with one of the respective adjacent node on the first communication channel or the respective adjacent node on the second communication channel to achieve a consistent broadcast of data on the first and second communication channels. Data exchanged between the source node and the respective adjacent node in the virtual self-checking pair is only sourced by the source node.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
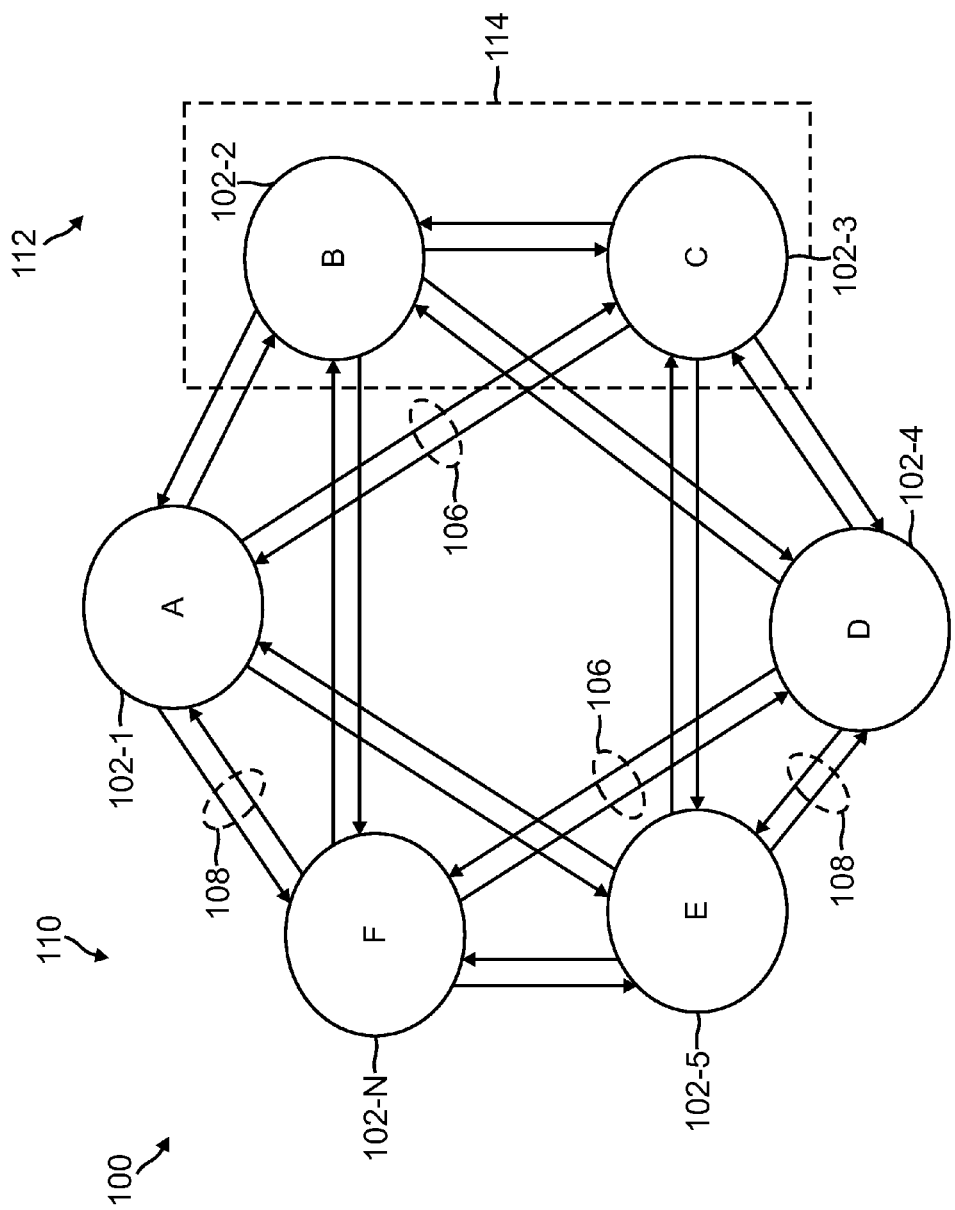
FIG. 1 is a block diagram of one embodiment of a network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one embodiment of a communication network 100. Communication network 100 includes a plurality of nodes 102-1 ... 102-N. The nodes of FIG. 1 are individually referenced herein as node A through node F. Although six nodes are shown in FIG. 1, it is to be understood that any number of nodes can be used in other embodiments. Each of the nodes 102 is coupled to each of its immediate or adjacent neighbors (also referred to herein as "direct neighbors" or "adjacent nodes") via respective direct links 108 and to each of its direct neighbors' neighbor (also referred to herein as "skip neighbors" or "skip nodes") via respective skip links 106. As shown in FIG. 1, direct links 108 and skip links 106 are implemented using full-duplex bi-directional links. However, it is to be understood that, in other embodiments, direct links 108 and skip links 106 are implemented using half-duplex bidirectional links.

Each node 102 has two "neighbor" nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node B in the clockwise direction and node F in the counter-clockwise direction. In addition, each node 102 has two neighbor's neighbor nodes 102, in this example, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node C in the clockwise direction and node E in the counter-clockwise direction.

As used herein, when a link 106/108 is described as being connected 'from' a first node 102 'to' a second node 102, the link 108 provides a communication path for the first node 102 to send data to the second node 102 over the link 106/108. That is, the direction of that link 106/108 is from the first node 102 to the second node 102.

For the sake of illustration, the details of nodes 102 are not shown in FIG. 1. However, it is understood that the nodes 102 are implemented using suitable hardware and/or software to implement the functionality described here as being performed by the nodes 102. Each such node 102 also includes a suitable network or other interface for communicatively coupling that node to the links 108 and 106. Examples of suitable node implementations are described in the '933 Application and the '249 Application, though it is to be understood that the nodes 102 can be implemented other ways The links 106 and 108 are used to form at least two logical communication channels. In the particular embodiment shown in FIG. 1, the first logical communication channel 110 comprises a communication path around the ring in a first direction (for example, in a counter-clockwise direction), and the second logical communication channel 112 comprises a communication path around the ring in a second direction (for example, in a clockwise direction). Each node 102 of the network 100 is communicatively coupled to at least one of channels 110 and 112.

For the respective direction in which data flows in the channels 110 and 112, the channels 110/112 communicatively directly couple (that is, with only one hop) each node 102 to at least two other nodes 102 from which that node 102 receives data (also referred to herein as "receive-from nodes") and to at least two other nodes 102 to which that node 102 transmits data (also referred to here as the "transmit-to nodes"). In one embodiment, one of the received-from nodes 102 is designated as a "primary" receive-from node 102 and the other receive-from nodes 102 are designated as "secondary" receive-from nodes 102. When a node "relays" data on channels 110/112 in the respective direction, the node 102 receives data from one or more receive-from nodes and forwards the received data onto the one or more transmit-to nodes. That is, when a node 102 is relaying data, the node 102 is not the source of the data that the node 102 is forwarding onto other nodes. In some embodiments, when a node 102 "relays" data, that node 102 receives data from the primary receive-from node 102 and forwards the receive data onto each of the transmit-to nodes designated for that node 102. Data received by a node from the secondary receive-from nodes 102 is used for the various comparison operations described below and/or is relayed in the event that suitable data is not received from the primary receive-from node. When a given node 102 "transmits" data (that is, when the given node 102 is the source of data communicated on the network 100) along channels 110/112, that node 102 transmits the data to each of the transmit-to nodes 102 designated for that node 102 for the respective channel 110/112.

In the particular embodiment shown in FIG. 1, the nodes 102 are arranged in a ring having a "braided ring" topology in which the nodes 102 communicate with one another over multiple communication channels 110/112 as described above. In the particular embodiment shown in FIG. 1, six nodes 102 communicate with one another over two replicated communication channels 110/112. In other embodiments, a different number and/or type of nodes 102 and/or channels 110/112 and/or a different network topology are used. For example, a mesh network topology can be used in other embodiments.

Embodiments of network 100 are implemented using various media access schemes. For example, the embodiment shown in FIG. 1 is described herein as being implemented using time division multiple access (TDMA) media access scheme (for example, the media access scheme implemented in the TTP/C or FLEXRAY protocols). In other embodiments, other media access schemes are used.

In the particular embodiment shown in FIG. 1, for channel 110, the receive-from nodes for each node 102 are that node's clockwise neighbor and clockwise neighbor's neighbor and the transmit-to nodes for each node 102 are that node's counter-clockwise neighbor and counter-clockwise neighbor's neighbor. In the embodiments described herein, the primary receive-from node is node's clockwise neighbor (though in other embodiments, the primary receive-from node is the node's clockwise neighbor's neighbor). In the particular embodiment shown in FIG. 1, for channel 112, the receive-from nodes for each node 102 are that node's counter-clockwise neighbor and counter-clockwise neighbor's neighbor and the transmit-to nodes for each node 102 are that node's clockwise neighbor and clockwise neighbor's neighbor. In the embodiments described herein, the primary receive-from node is node's counter-clockwise neighbor.

In the particular embodiment shown in FIG. 1, the network 100 is implemented as a peer-to-peer network in which each transmission is intended to be received by each node 102 of the network 100. In other embodiments, each transmission is intended for a particular destination node. Moreover, in the embodiments described here, data is communicated in the network 100 in the form of frames of data though it is to be understood that, in other embodiments, other units of data are communicated over the network 100.

At least one of the nodes 102 is configured to form a virtual self-checking pair with one of its neighbor nodes (referred to herein as the 'virtual pair node') when transmitting data on both channels. In the example shown in FIG. 1, node C forms a virtual self-checking pair 114 with node B. Nodes C and B then act as a self-checking pair to output the data to the other nodes of the network 100. However, in the embodiments described herein, only one of the nodes in the self-checking pair sources the data to be compared. For example, rather than sourcing the data to be compared in both node B and node C, only node C sources the data, as described in more detail below. Thus, unlike typical self-checking pairs, virtual self-checking pairs in the embodiments described herein have a simplex source. Self-checking pairs which have a simplex source of data are referred to herein as 'virtual self-checking pairs.' Additional details regarding comparisons and actions of self-checking pairs in which both nodes source the data are described in U.S. Pat. No. 7,372,859 which is incorporated herein by reference in its entirety.

For example, when node C has data to send that requires the data to agree on both channels 110/112, node C forms a virtual self-checking pair 114 with one of its neighbors (node B in this example). In one embodiment, node C forms the virtual self-checking pair 114 with node B by sharing the data it wants to send with node B ahead of the transmission to the rest of the nodes 102 in the network 100. For example, if a schedule, such as a Time Division Multiple Access (TDMA) schedule, indicates that node C is to transmit data in timeslot N, node C passes the data to be transmitted to node B during timeslot N−1. Then, in the timeslot N when the data is broadcast to the network 100 from the self-checking pair 114, nodes B and C output the data using a self-checking pair action, such as the self-checking pair action described in the '249 application. That is, nodes B and C compare the data to ensure that the data is consistent between each of the respective directions of channels 110 and 112. In particular, nodes B and C exchange the data to be transmitted on channels 110/112 to ensure that the data output by node B onto channels 110/112 is the same as the data transmitted by node C on the channels 110/112.

When other nodes 102 of the network 100 receive the data from the self-checking pair 114, the other nodes 102 (also referred to herein as the 'receiving nodes') determine if the data received on the same channel from the respective direct link 108 and skip link 106 match. For example, node A compares the data received from node B on channel 110 over the respective direct link 108 to the data received from node C on channel 110 over the respective skip link 106 to determine if the data matches. Similarly, node D compares the data received from node C on channel 112 over the respective direct link 108 to the data received from node B on channel 112 over the respective skip link 106. In particular, in this embodiment, each receiving node is configured to store the data received over one link until the corresponding data is received over the other link in order to compare the data prior to forwarding the data on to another node. If the data matches, nodes A and D determine that the data has directional integrity due to the action of the virtual self-checking pair. In particular, due to the action of the virtual self-checking pair, a consistent data broadcast is achieved. As used herein, a consistent data broadcast is defined to mean that the data transmitted on one channel is the same as the data transmitted simultaneously on other channels. Thus, due to the virtual self-checking pair, if nodes A and D determine that the data on the skip and direct links match, nodes A and D can determine that the data received on one channel is the same as the data being transmitted over the other channel.

In the above example, the sending node determines when to form a virtual self-checking pair based on a transmission schedule. Similarly, the actions of the virtual pair node and the receiving nodes are determined based on the transmission schedule. For example, the receiving nodes are configured to require the self-checking agreement for directional acceptance based on the transmission schedule. In addition, the schedule-based virtual self-checking pair can be implemented using a Virtual Link (VL) look-up table using a Time Triggered Ethernet (TTEthernet) protocol.

Figure 2A:
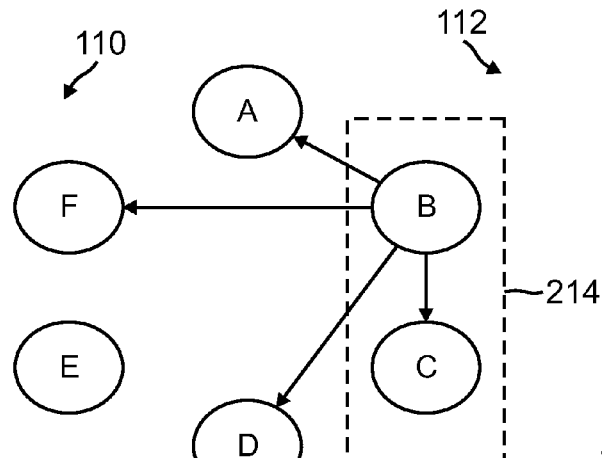
FIGS. 2A-2C are block diagrams depicting exemplary propagation of a message in one embodiment of a network.
Figure 2B:
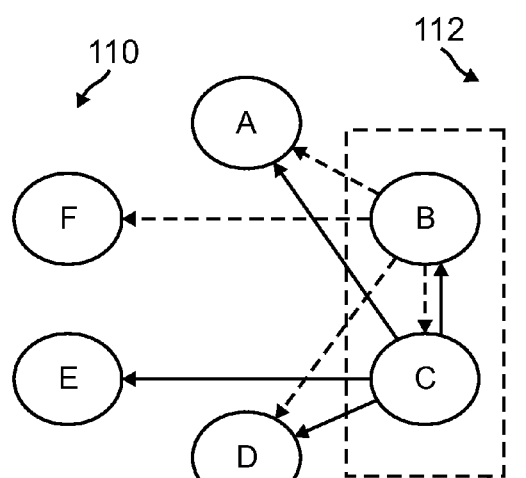
Figure 2C:
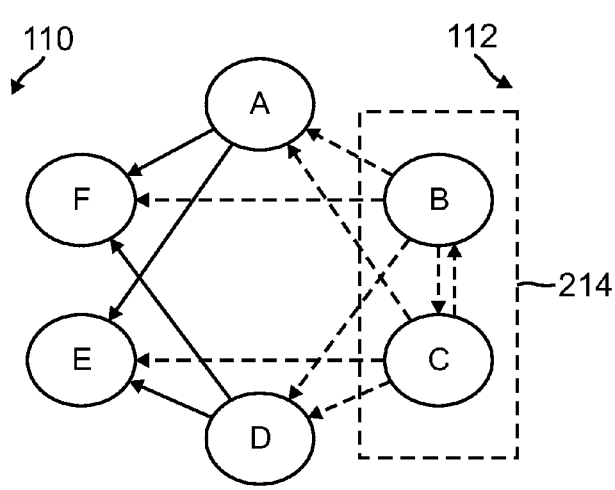

In other embodiments, the virtual pair node can be configured to reflect back the data from the sending node rather than receiving the data from the sending node ahead of the scheduled transmission time. For example, FIGS. 2A-2C depict data propagation using the reflect back mechanism. In the Example of FIGS. 2A-2C, node B is the sending node and node C is the virtual pair node. Node B sends data along both channels 110 and 112 as shown in FIG. 2A. Upon receiving the message from node B along channel 112 (indicated with dashed lines in FIG. 2B), node C reflects the message back to nodes A and B along the channel 110 and forwards the data along channel 112. The forwarded messages from node C are indicated with solid lines in FIG. 2B.

In some embodiments, a message ID routing table is used by the virtual pair node to determine when to reflect back the message received from the sending node. For example, in some such embodiments, the sending node (e.g. node B in the example of FIG. 2A) transmits its data as a typical simplex sending node. However, based on the message ID routing table, the virtual pair node (node C in the example of FIG. 2A) is configured to immediately (i.e. with little or no delay) reflect back the data on all the ports of the virtual pair node. That is, rather than only forwarding the data along the channel on which the data is received, the virtual pair node forwards the data on both channels. In this way, both the node which sources the data and the virtual pair node output the data on both channels. Thus, the virtual pair node does not receive the data beforehand and store the data until the scheduled transmission. Alternatively, the virtual pair node can determine to immediately reflect back the data on both channels based on the TDMA schedule.

As shown in FIG. 2C, the other nodes in the network forward the message along the channel it was received after comparing the message received over the direct link to the message received over the skip link, as described above. For example, node A forwards the data along channel 110 and node D forwards the data along channel 112 (indicated by solid lines in FIG. 2C).

In embodiments using the message ID routing table, the checks performed by the receiving nodes and the virtual pair node are implemented as part of the message ID routing table, as opposed to a schedule. Similarly in such an embodiment, the enforcement checks, e.g. self-checking pair agreement required for single directional reception acceptance, is implemented via the message ID routing look up table.

Figure 3:
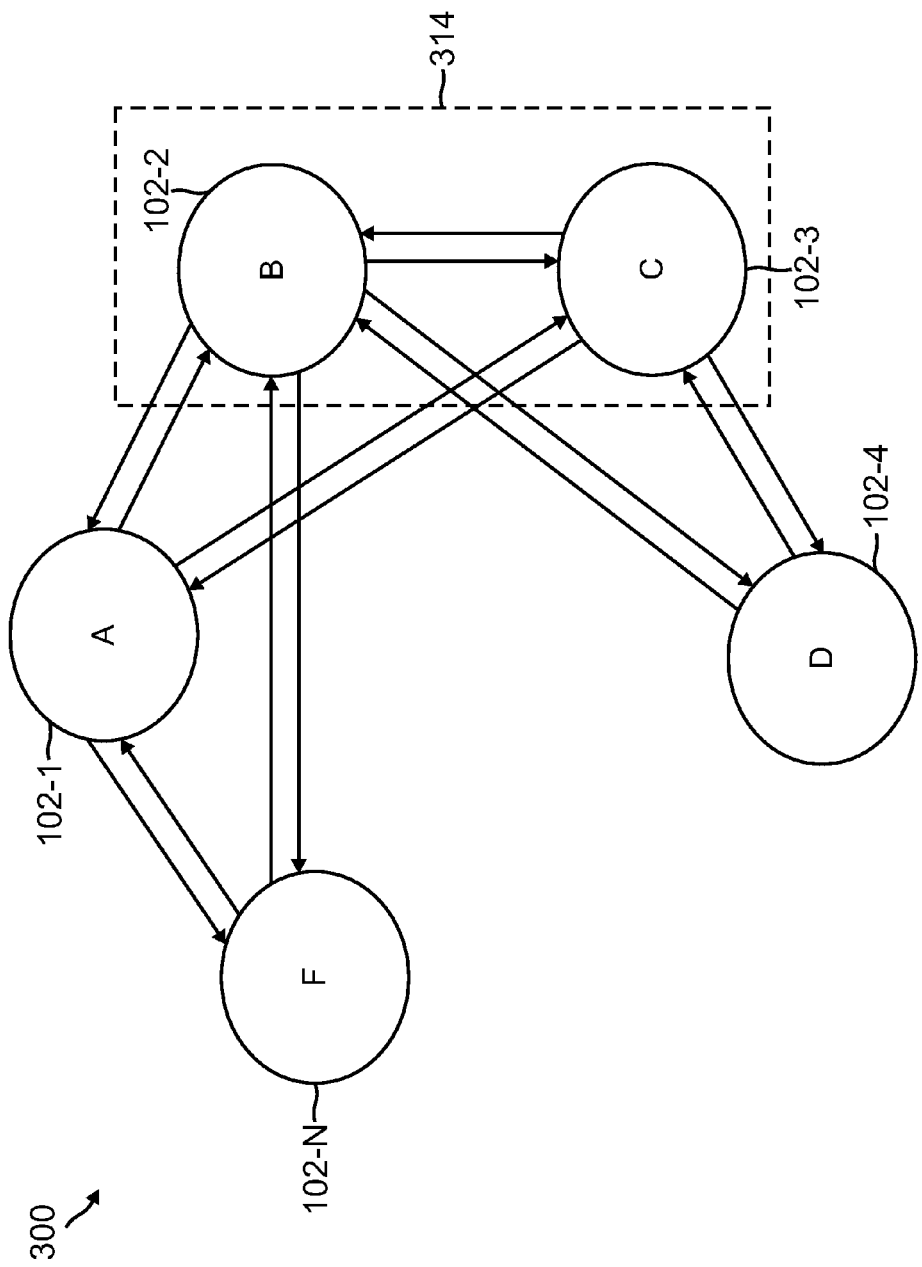
FIG. 3 is a block diagram of another embodiment of a network.

In addition, the action of the virtual self-checking pair helps ensure that data is consistent in both directions even if the ring is not complete. For example, as shown in FIG. 3, the nodes 102 of network 300 are coupled to one another in a manner similar to the nodes 102 of FIG. 1. However, in network 300, node E is not present, such as due to an offline or faulty node. Despite the absence of node E, the message comparison by the self-checking pair 314 helps ensure that the data transmitted on channels 110 and 112 is consistent.

Furthermore, in some embodiments, each of the receiving nodes is configured to increment a hop count field in the message data transmitted from the sending node (e.g. node C in this example) prior to forwarding the received data to other nodes 102. In addition, each receiving node compares the incremented hop count value of the data received over channel 110 to the incremented hop count value of the data received over channel 112 in order to qualify the self-checking pair action of self-checking pair 114. In other words, the hop count is used by each of the receiving nodes to detect if one of the nodes in the self-checking pair 114 is masquerading as a pair which could compromise the directional integrity of the data if the single node is transmitting different data on each channel.

In particular, each receiving node performs a calculation using a hop count value from each channel 110/112 and compares the result of the calculation to one or more allowed values. In particular, the allowed values include the total number of nodes, N, in the network or the total number of nodes minus one (N−1). For example, in one embodiment, the sending node (node C in this example) and the virtual pair node (node B in this example) are each configured to set the initial hop count to zero. Each receiving node is configured to increment the hop count for the respective link over which the data is received. For example, in this embodiment, the receiving nodes are configured to increment the hop count of messages received over direct links 108 by "1" and to increment the hop count of messages received over skip links 106 by "2". After incrementing the hop count, each receiving node sums the hop count value from channel 110 with the hop count value from channel 112. If the sum of the hop count does not equal N or N−1, the receiving node determines that a fault has occurred.

By allowing the sum of the hop count to equal N, network 100 enables greater availability of the sending node in the event that the virtual pair node fails passively or actively. In particular, if the sending node transmits data on channel 110 that is identical to, or within an acceptable bounded tolerance level of, the data transmitted on channel 112, the receiving nodes are still able to use the data regardless of the actions of the virtual pair node if the sum of the hop count is equal to N.

In addition, each node 102 is configured to prevent the hop count value from being negative or below zero. For example, if a node receives a hop count value with a negative value, the node is configured to set the hop count value to the initial value (zero in this example) and then perform the corresponding increment of the hop count value. In this way, a node is not able to prevent false hop count values. If a node attempts to impersonate another node by modifying the hop count value to be negative, the hop count calculation performed by each receiving node will result in a number that is not equal to N or N−1 by not allowing the hop count value to be less than zero. Therefore, a node is unable to create a false hop count value to be received over the two channels that will sum to the allowed value at each receiving node.

In other embodiments, other calculations and/or increment values are used. For example, in some embodiments, the sending node and virtual pair node are configured to set the initial count value to the total number of nodes, N. Each receiving node is then configured to decrement the hop count value of messages received over direct links 108 by "1" and to decrement the hop count value of messages received over skip links 106 by "2". In such embodiments, after decrementing the hop count values, each receiving node sums the decremented value from channel 110 to the decremented value from channel 112. If the sum of the hop counts does not equal N or N−1, or a multiple thereof, the receiving node determines that a fault has occurred.

In other embodiments, the initial hop count value is set to "1" and each receiving node is configured to multiply the hop count value by a predetermined amount. For example, in some such embodiments, the receiving nodes are configured to multiply the hop count value received over direct links 108 by "2" and to multiply the hop count value received over skip links 106 by "4". After multiplying the hop counts values received from each respective channel, each receiving node is configured to multiply the hop count value from channel 110 by the hop count value from channel 112. Each receiving node then compares the log base two of the resultant product to the total number of nodes. If the log base 2 of the product is not equal to the total number nodes, then a fault is declared.

It is to be understood that other calculations or variations of the calculations described above can be used in other embodiments. For example, in some embodiments, each receiving node is configured to increment the hop count value received over the direct links 108 by "2" and to increment the hop count value received over the skip links by "4". Each of the receiving nodes sums the incremented hop count value from channel 110 with the incremented value from channel 112 and compares the sum to 2*N or 2*(N−1). In other embodiments, the initial hop count value is set to zero on one channel and to the total number of nodes, N, on the other channel. In such embodiments, each receiving node is configured to increment the hop count value for the channel having an initial value of zero and to decrement the hop count value for the channel having an initial value equal to N.

As a result of the virtual self-checking pair and the hop count field, the embodiments described herein provide various advantages over conventional single fault tolerant systems. For example, the use of the virtual self-checking pair enables the network 100 to ensure that data from a simplex source does not diverge on different channels without requiring that the data be exchanged by all downstream nodes that receive the data from the simplex source. In addition, using the virtual self-checking pair and hop count reduces reliance on guardian nodes which could disrupt traffic in each direction if faulty. Indeed, a guardian node action is not required in embodiments using the virtual self-checking pair and hop count action described above.

Figure 4:
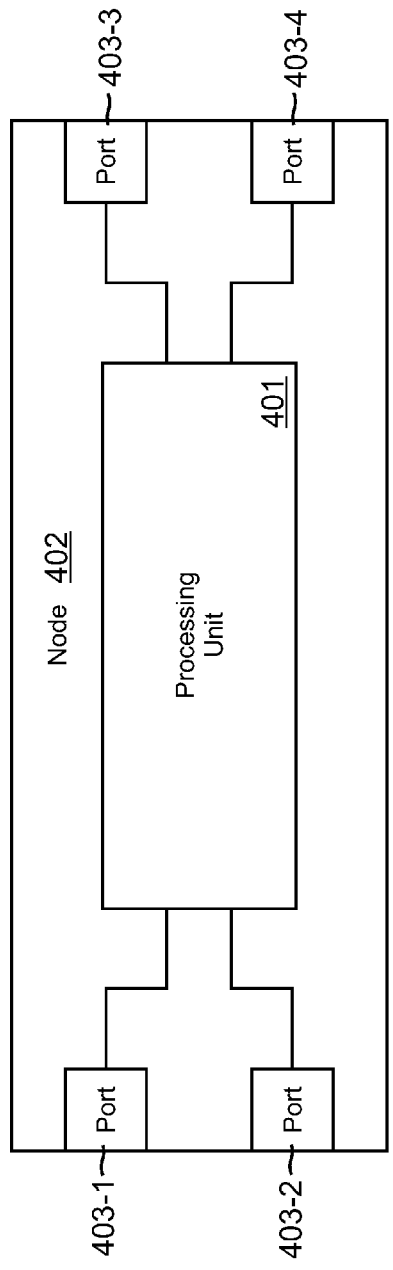
FIG. 4 is a block diagram of one embodiment of a communication node.

FIG. 4 is a block diagram of an exemplary node 402 that can be implemented in a communication network such as network 100 above. Node 402 includes a plurality of ports 403. In particular, node 402 includes a port 403-1 configured to receive data on a first channel in a first direction from a first neighbor node adjacent to the node 402 via a direct link and to communicate data to the first neighbor node on a second channel in a second direction via the direct link. It is to be understood that in some embodiments, the links coupling the node 402 to other nodes are implemented using full-duplex bi-directional links and, in other embodiments, the links are implemented using half-duplex bi-directional links. In addition, as used herein, the term "communicating data" refers to either transmitting data or forwarding data, whereas "transmitting" refers to outputting data that is sourced at the node 402 and "forwarding" refers to outputting data that is sourced from another node and received at node 402.

Node 402 also includes port 403-2 which is configured to receive data on the first channel from a first neighbor's neighbor node via a skip link and to communicate data to the first neighbor's neighbor node on the second channel via the skip link. Node 402 also includes port 403-3 which is configured to receive data from a second neighbor node on the second channel via a direct link and to communicate data on the first channel to the second neighbor node via the direct link. Node 402 also includes port 403-4 which is configured to receive data from a second neighbor's neighbor node on the second channel via a skip link and to communicate data to the second neighbor's neighbor node on the first channel via the skip link.

In addition, node 402 includes a processing unit 401. Processing unit 401 is configured to communicate with one of the first neighbor node and the second neighbor node to form a virtual self-checking pair. In particular, when the node 402 sources data to be transmitted to other nodes of the network, the processing unit 401 determines when to form a virtual self-checking pair with one of the first neighbor node and the second neighbor node. For example, in some embodiments, the processing unit 401 analyzes a transmission schedule to determine when to form a virtual self-checking pair. In some such embodiments, the processing unit 401 directs the transmission of the data being sourced by the node 402 to the other node forming the virtual self-checking pair prior to the scheduled timeslot in which the node 402 is to transmit the data to the other nodes of the network.

Alternatively, in other embodiments, the processing unit 401 determines when to form a virtual self-checking pair based on a message identification (ID) routing table, as discussed above. That is, based on the message ID routing table, the node 402 transmits the data to the other node of the virtual self-checking pair. The other node of the virtual self-checking pair then reflects the data back on all ports based on the message ID routing table, as described above.

In addition, the node 402 is configured to increment a hop count value for data sourced from another node and received over one of the ports 403 at the node 402. For example, in some embodiments, the hop count value is a bit that is set in the hardware components at the physical layer of the node 402 prior to forwarding the data. In other embodiments, the hop count value is incremented in the application layer by the processing unit 401 running a higher level application.

As used herein the term "increments" is defined to include increasing the hop count value (i.e. incrementing by a positive value) and decreasing the hop count value (i.e. incrementing by a negative value). For example, in some embodiments, the hop count value is initially set to zero by the node which sources the data. In such embodiments, the node 402 increases the received hop count value. In other embodiments, the hop count value is initially set to the total number of nodes in the network by the node which sources the data. In such embodiments, the node 402 decreases the received hop count value. It is to be understood that the initial hop count value and the corresponding increment value can vary based on the implementation of the network. For example, in some embodiments, the initial value is set to '1' and the node 402 is configured to multiply the received hop count value by '2'.

Furthermore, the increment value can be different for data received over a direct link than for data received over a skip link. In particular, if the skip link bypasses one or more nodes, the function used to increment the hop count value received over the skip link is configured to compensate for the nodes that are bypassed. For example, in some embodiments, the hop count value is increased by '1' if received over a direct link and is increased by '2' if received over a skip link that bypasses a single node. In other words, the function adds '1' to the hop count value received over the direct link and adds 'M+1' to the hop count value received over the skip link, where M is equal to the number of nodes bypasses by the skip link.

In addition, the node 402 is configured to increment the hop count value received over the first channel in the first direction and to increment the hop count value received over the second channel in the second direction. Indeed, in some embodiments, the increment value for the first channel is different than the increment value for the second channel. For example, in some embodiments, the hop count value is increased on the first channel and decreased on the second channel. In other embodiments, the increment value is the same for both channels.

The node 402 is also configured to prevent the hop count value from being a negative value. In particular, if the received hop count value is a negative value, the node 402 is configured to set the hop count value to a default value and then increment the hop count value using the predetermined increment value. For example, in some embodiments, the default value is zero. In other embodiments, other default values such as '1' or the total number of nodes in the network.

By preventing a negative value in the hop count, node 402 helps prevent the node that sourced the data from masquerading as a different node. In particular, in order to accept the data for processing, in some embodiments, the node 402 combines the hop count value received over the first channel with the hop count value received over the second channel. The node 402 then compares the sum of the hop count values with a predetermined value. In particular, as described above, if the sum does not equal N or N−1, or a multiple thereof, where N is the total number of nodes in the network, the node 402 determines that a fault has occurred. For example, since the data is transported around the network in both the first and second directions, the hop count value is used to identify the node that sourced the data. The source node cannot successfully act as a different node since the sum of the hop count values will not equal the proper predetermined value since a negative value is not permitted. In other words, the source node would need an initial negative value in at least one direction to masquerade as a different node and have the sum of the hop count values equal the predetermined value.

In addition, by allowing the sum to equal N or N−1, the node 402 is able to accept the data from the source node even if the source node formed a virtual self-checking pair and the virtual pair node is faulty. That is, the node 402 compares the data received from the first channel to the data received from the second channel. If the data matches and the hop count value is equal to N, the node 402 accepts the data from the source node as being non-faulty (i.e. having high integrity). Thus, a faulty virtual pair node does not prevent the availability of a functioning source node.

Figure 5:
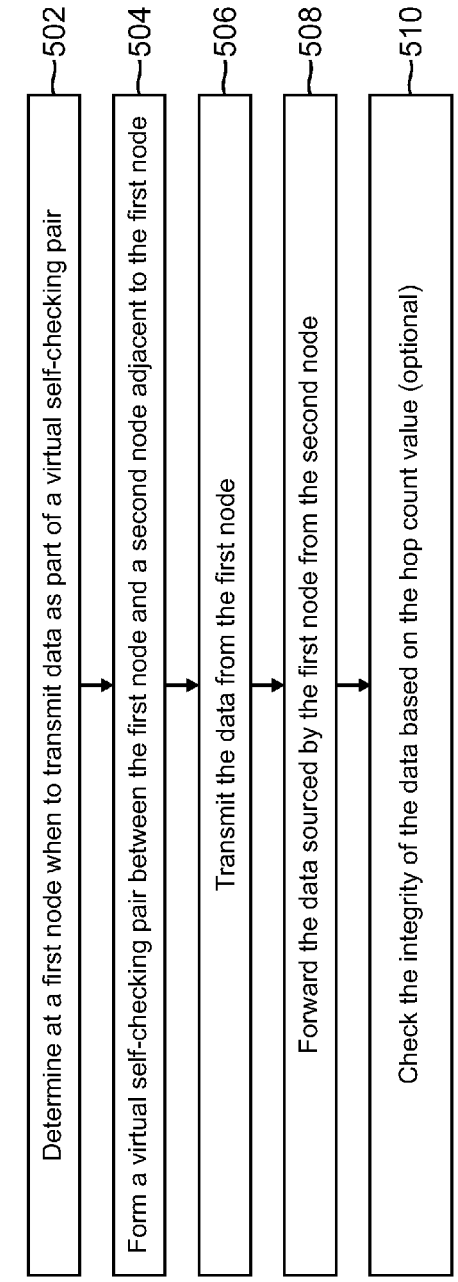
FIG. 5 is a flow chart depicting one embodiment of a method of communicating data in a network

FIG. 5 is a flow chart depicting a method 500 of communicating data in a network. Method 500 can be implemented in a network such as network 100 described above. At block 502, it is determined at a first node when to transmit data as part of a virtual self-checking pair. Thus, the first node is the source of the data. In some embodiments, the determination is based on a transmission schedule, as described above. In other embodiments, the determination is based on a message ID routing table, as described above.

At block 504, a virtual self-checking pair is formed between the first node and a second node adjacent to the first node (e.g. a neighbor node of the first node). For example, in some embodiments, forming the virtual self-checking pair includes providing the data from the first node to the second node prior to the scheduled timeslot in which the first node is to transmit the data. At block 506, the data is transmitted from the first node. In particular, the data is transmitted over a first channel to a third node adjacent to the first node (e.g. a neighbor node of the first node) and to a fourth node adjacent to the third node (e.g. a neighbor's neighbor node of the first node). The third node is located between the fourth node and the first node. In addition, the data is transmitted from the first node over a second channel to the fifth node (e.g. a neighbor's neighbor node of the first node).

At block 508, the data sourced by the first node is forwarded by the second node. In particular, the second node forwards the data over the second channel to the fifth node adjacent to the second node (e.g. a neighbor node of the second node) and to a sixth node adjacent to the fifth node (e.g. a neighbor's neighbor node of the second node). The fifth node is located between the sixth node and the second node. In addition, the second node forwards the data sourced by the first node over the first channel to the third node.

In some embodiments, at block 510, each of the nodes receiving the data sourced from the first node and output from the virtual self-checking pair optionally checks the integrity of the data based on the hop count value. One embodiment of checking the integrity based on the hop count is shown in FIG. 5.

Figure 6:
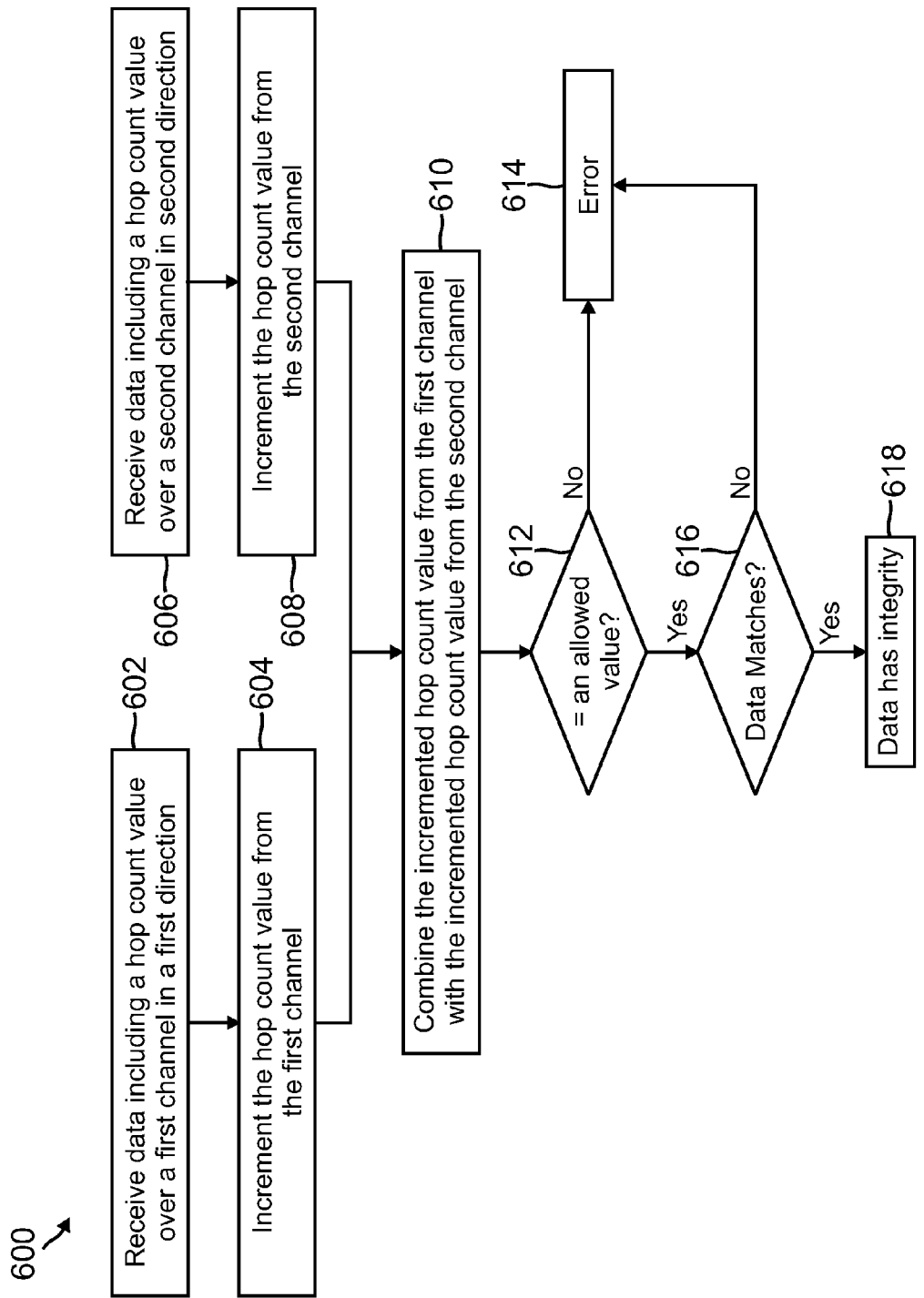
FIG. 6 is a flow chart depicting one embodiment of a method of checking the integrity of the received data based on the hop count value.

FIG. 6 is a flow chart of a method 600 for checking the integrity of the received data based on the hop count value. At block 602, data including a hop count value is received over a first channel in a first direction. At block 604, the hop count value from the first channel is incremented, as described above. One embodiment of a method of incrementing the hop count value is shown in FIG. 7.

At block 606, data including a hop count value is received over a second channel in a second direction. At block 608, the hop count value from the second channel is incremented. At block 610, the incremented hop count value from the first channel is combined with the incremented hop count value from the second channel. For example, the hop count values can be summed or multiplied with each other. At block 612, the combined hop count values are compared to allowed values. In particular, in this embodiment, the allowed values are N, N−1, or a multiple of N or N−1, where N is the total number of nodes in the network.

If the combined hop count value does not equal an allowed value, an error is declared at block 614. If the combined hop count value is equal to an allowed value, the data received over the first channel is compared to the data received over the second channel, at block 616. If the data received over the first channel matches the data received over the second channel, the data is accepted as having integrity for further processing at block 618. If the data over the first channel does not match the data received over the second channel, an error is declared at block 614.

Figure 7:
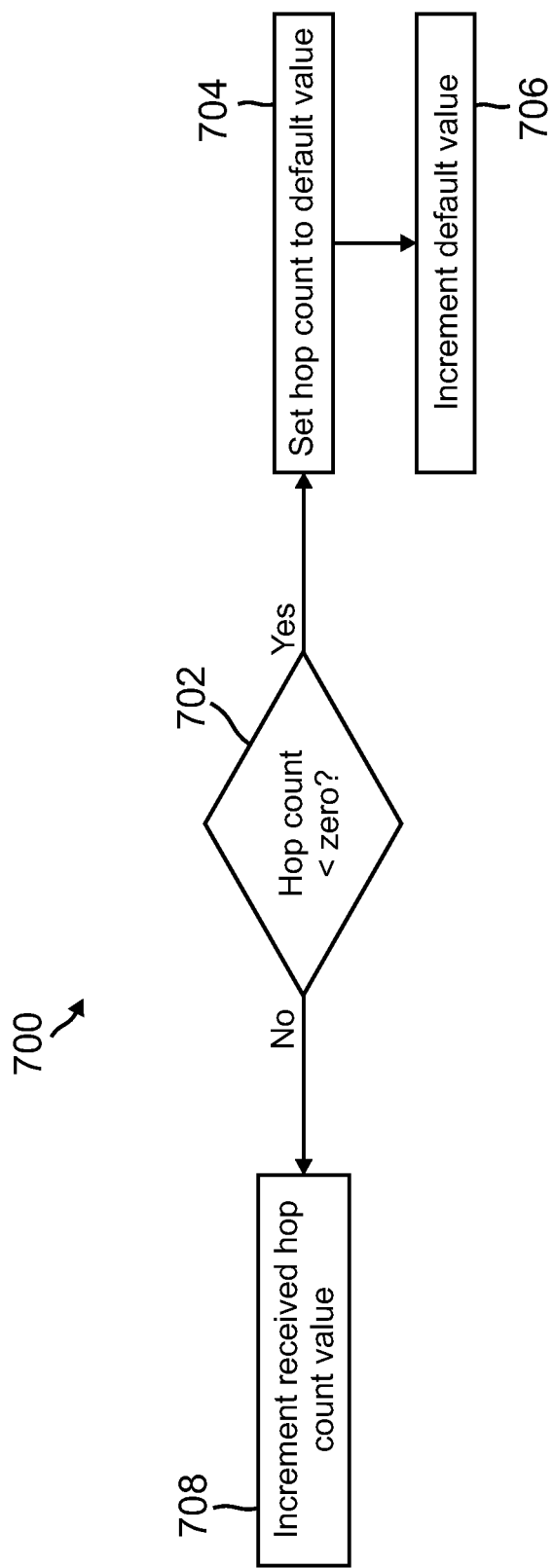
FIG. 7 is a flow chart depicting one embodiment of a method of incrementing the hop count value.

FIG. 7 is a flow chart of a method 700 for incrementing the hop count value at each of the receiving nodes. At block 702, it is determined if a received hop count value is less than zero. If the hop count value is less than zero, the hop count value is set to a default value at block 704, as described above. The default hop count value is then incremented at block 706, using the techniques discussed above. If the hop count value is not less than zero, the received hop count value is incremented at block 708.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A network comprising:
a plurality of nodes; and
a plurality of links communicatively coupling each of the plurality of nodes to at least one respective adjacent node of the plurality of nodes via a first communication channel and to another respective adjacent node of the plurality of nodes via a second communication channel;
wherein at least one of the plurality of nodes is a source node configured to source data;
wherein the source node is configured to form a virtual self-checking pair with one of the respective adjacent node on the first communication channel or the respective adjacent node on the second communication channel to achieve a consistent broadcast of data on the first and second communication channels;
wherein the data to be broadcast on the first and second channels is exchanged between the source node and the respective adjacent node in the virtual self-checking pair and is only sourced by the source node.

2. The network of claim 1, wherein the source node and the respective adjacent node are configured to determine when to form a virtual self-checking pair based on one of a transmission schedule and a message identification (ID) routing table.

3. The network of claim 2, wherein the source node is configured to provide the data to be exchanged to the respective adjacent node prior to a scheduled timeslot in which the source node is scheduled to transmit the exchanged data.

4. The network of claim 1, wherein the plurality of links comprises:
a first plurality of links communicatively coupling each of the plurality of nodes to a respective adjacent node on the first channel and a respective adjacent node on the second channel; and
a second plurality of links communicatively coupling each of the plurality of nodes to a respective skip node on the first channel and a respective skip node on the second channel.

5. The network of claim 1, wherein the source node is configured to insert an initial hop count value into the data being transmitted, wherein each of the other nodes of the plurality of nodes not in the virtual self-checking pair is configured to increment the hop count value prior to forwarding the data and to prevent the hop count value from being a value less than zero.

6. The network of claim 5, wherein each of the other nodes is configured to prevent the hop count from being a value less than zero by setting the hop count to a default value if the received value is less than zero and then incrementing the default value prior to forwarding the data.

7. The network of claim 5, wherein each of the other nodes is configured to increase the hop count value in the data received on the first channel and to decrease the hop count value in the data received from the second channel.

8. The network of claim 5, wherein each of the other nodes is configured to combine the incremented hop count value from the first channel with the incremented hop count value from the second channel and to compare the combined hop count value to the total number of nodes in the network;
wherein each node is configured to accept the data if the combined hop count is equal to a multiple of the total number of nodes in the network or if the combined hop count is equal to a multiple of the total number of nodes minus one.

9. The network of claim 1, wherein when the respective adjacent node in the virtual self-checking pair receives data sourced from the source node, the respective adjacent node in the virtual self-checking pair is configured to reflect the received data on both the first and second channels.

* * * * *